3,148,157
METHOD FOR THE PRODUCTION OF A HYDRO-
CARBON CONVERSION CATALYST
Ernest L. Pollitzer, Hinsdale, and Erwin E. Meisinger,
Elmhurst, Ill., assignors to Universal Oil Products
Company, Des Plaines, Ill., a corporation of Delaware
No Drawing. Filed July 15, 1960, Ser. No. 42,986
3 Claims. (Cl. 252—438)

This invention relates to hydrocarbon conversion catalysts and also to a method for the production thereof. More particularly the invention is concerned with a process for preparing catalysts which are useful for polymerizing unsaturated hydrocarbons.

The need for crude rubber, either natural or synthetic has increased at a tremendous rate inasmuch as rubber has attained a position of great importance as a material of modern manufacture, said importance being due to the diverse uses to which it may be put. Heretofore in past years the amount of rubber which may be obtained naturally from rubber trees has been sufficient to satisfy the requirements of modern living. However, the sources of natural rubber may be made unattainable to many countries due to emergencies which may arise. This condition was made apparent during the last war when many sources of natural rubber in the Far East, such as Southeast Asia, were cut off from the Western Hemisphere. When situations such as this arise, substitutes must be found to take the place of the missing natural rubber. Heretofore, synthetic rubbers such as the types produced by the reaction of butadiene and styrene (GR–S), butadiene and acrylonitrile (Buna-M), butadiene and isobutylene, Thiokol rubber, silicone rubber, Neoprene rubber, etc., have been prepared. However, these products have usually been inferior to natural rubber in many of the necessary properties when in the vulcanized, elastic state.

It has now been discovered that a diolefinic hydrocarbon such as isoprene may be caused to polymerize stereoselectively to a rubbery product similar in many respects to the natural Hevea type rubber. The uses of such a rubber in articles of manufacture are many and varied, being too numerous to list in their entirety. A few representive uses are, for example, raw rubber which may be used in the shoe industry for the production of crepe soles for shoes, for erasers, adhesive cements and in the fabrication of gummed fabrics such as, for example, rubber cloaks; vulcanized rubber products which will include bumpers, buffers, vehicle tires, shock- and sound-proof articles, rubber bands, stoppers, stamps, sponges, elastic thread, belts, packing materials for machine construction, installation, etc.; and hard rubber which may be used as a suitable material for combs, tubing, fountain pens, dental goods, etc.

Therefore, as hereinbefore set forth, the need for a diolefinic hydrocarbon such as isoprene is greatly magnified, said compound assuming a greater importance than heretofore known for the production of such a rubber as the hereinabove mentioned Hevea type.

It has now been discovered that unsaturated organic compounds such as olefinic hydrocarbons and, particularly, propylene may be selectively converted in the presence of a novel catalyst hereinafter set forth to form a dimer of propylene, namely, 2-methyl-2-pentene, which is an intermediate in the preparation of isoprene, the final product being obtained by the demethanation of the propylene dimer.

In addition to the preparation of dimers which are used as intermediates in the preparation of isoprene the polymers prepared according to the process of this invention may also be used for motor fuels such as gasoline and as intermediates in the preparation of surface active agents or solvents such as alcohols, amines, etc.

It is therefore an object of this invention to provide a catalyst which is useful for the conversion of organic compounds to prepare desired products.

Another object of this invention is to provide a catalyst which will selectively convert unsaturated hydrocarbons to preferred polymers thereof.

A specific object of this invention is to provide a method for preparing catalysts which will selectively polymerize certain olefinic hydrocarbons to provide an improved yield of the desired polymeric product.

One embodiment of this invention resides in a process for the conversion of an unsaturated organic compound which comprises treating said compound at conversion conditions in the presence of a hydrocarbon conversion catalyst which has been prepared by treating a metal oxide support with a compound selected from the group consisting of alkali metal hydroxides and alkali metal salts, calcining the resultant promoted metal oxide support and thereafter impregnating the support with an alkali metal compound selected from the group consisting of alkali metals and alkali metal amides, while said promoted metal oxide support is immersed in liquid ammonia.

Another embodiment of this invention resides in a method for the production of a hydrocarbon conversion catalyst which consists in treating a metal oxide support with a compound selected from the group consisting of alkali metal hydroxides and alkali metal salts, calcining the resultant promoted metal oxide support and thereafter impregnating the support with an alkali metal compound selected from the group consisting of alkali metals and alkali metal amides, the improvement in said method comprises immersing the promoted metal oxide support in liquid ammonia while impregnating said support with the alkali metal compound.

A further embodiment of this invention resides in a method for the production of a hydrocarbon conversion catalyst which consists in treating a gamma-alumina support with a compound selected from the group consisting of alkali metal hydroxides and alkali metal salts, calcining the resultant promoted gamma-alumina at a temperature in the range of from about 500° to about 750° C. and thereafter impregnating the support with an alkali metal compound selected from the group consisting of alkali metals and alkali metal amides, the improvement in said method comprises immersing the promoted gamma-alumina in liquid ammonia while impregnating said support with the alkali metal compound.

A specific embodiment of this invention resides in a process for the dimerization of propylene which comprises treating said propylene at a temperature in the range of from about 50° to about 300° C. and at a pressure in the range of from about 5 to about 250 atmospheres in the presence of a catalyst which has been prepared by treating gamma-alumina with lithium nitrate, calcining the resultant promoted gamma-alumina support at a temperature in the range of from about 500° to about 750° C., impregnating said support with potassium amide, while the promoted gamma-alumina support is immersed in liquid ammonia, and evaporating the liquid ammonia.

Another specific embodiment of the invention resides in a method for the production of a hydrocarbon conversion catalyst which consists in treating the metal oxide support with lithium nitrate, calcining the resultant promoted metal oxide support at a temperature in the range of from about 500° to about 750° C. and thereafter impregnating the promoted support with an alkali metal compound selected from the group consisting of alkali metals and alkali metal amides, the improvement in said method which comprises immersing the promoted metal oxide support in liquid ammonia while impregating said support with the alkali metal compound.

A more specific embodiment of the invention is found in a method for the production of a hydrocarbon conversion catalyst which consists in treating a gamma-alumina support with lithium nitrate, calcining the resultant promoted gamma-alumina support at a temperature in the range of from about 500° to about 750° C. and thereafter impregnating the support with potassium, the improvement in said method which comprises immersing the promoted gamma-alumina support in liquid ammonia while impregnating said support with potassium, evaporating the liquid ammonia and treating the resultant product with gaseous ammonia to form the desired catalyst.

Other objects and embodiments referring to alternative animated alkali metals and promoted metal oxide supports will be found in the following further detailed description of the invention.

Unsaturated organic compounds and particularly olefinic hydrocarbons which may be condensed (the terms "condensed" and "condensation" as used herein in the specification and appended claims will be defined as, but not limited to, "polymerized" and "polymerization," and may also include alkylation) by heating in the presence of a novel catalyst of the type hereinafter more fully described include monoolefins such as ethylene, propylene, 1-butene, 2-butene, 1-pentene, 2-pentene, 1 hexene, 2-hexene, 3-hexene, 1-heptene, 2-heptene, etc., polyolefins such as 1,3-butadiene, 2-methyl-1,3-butadiene, 1,3-pentadiene, 1,4-pentadiene, 1,3-hexadiene, 1,4-hexadiene, etc.; cyclic olefins such as cyclopentene, cyclohexene, cycloheptene, etc. In addition it is also contemplated within the scope of this invention that besides the aforementioned olefins which may be condensed by themselves, other olefins of the types hereinbefore listed may be condensed with a dissimilar olefin although not necessarily with equivalent results. In addition to the condensation of the aforementioned olefins the catalyst composition hereinafter described may be used as a catalyst for the side chain alkylation of alkaryl compounds, and particularly alkyl aromatic hydrocarbons which contain at least one replaceable hydrogen atom on the $\alpha$-carbon atom in the side chain, such compounds including toluene, o-xylene, m-xylene, p-xylene, ethylbenzene, propylbenzene, isopropylbenzene, butylbenzene, the diethylbenzenes, the dipropylbenzenes, etc., the aforementioned olefinic hydrocarbons, or compounds capable of forming olefinic hydrocarbons under the conditions at which the reaction proceeds being used as the alkylation agents. Furthermore, the catalyst composition will act as an isomerization catalyst, shifting the double bond of unsaturated hydrocarbons, such as butene-1 or propylene dimer (2-methyl-1-pentene), usually to a more centralized position in the chain without further polymerization of the olefin, said isomerization involving only the shift of the double bond without carbon skeleton rearrangement.

As hereinbefore set forth the invention is concerned with the preparation of a hydrocarbon conversion catalyst and particularly a catalyst which is active in the polymerization of unsaturated compounds hereinabove set forth. The catalyst comprises an animated alkali metal disposed on a promoted metal oxide support. The term "promoted" as used hereinbefore and hereinafter in the specification and appended claims will refer to a pretreatment of the metal oxide support with a salt or hydroxide of both the alkali metals and alkaline earth metals such as lithium, sodium, potassium, rubidium cesium, calcium, strontium, and barium. However, not every solid support can be utilized as a satisfactory one for disposal of an alkali metal thereon. As is well known to one experienced in the art, the alkali metals react relatively violently with water and thus care must be taken to utilize those supports which are relatively or substantially free from water. In most cases, this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form. In addition to the necessity for freedom from water, the support is characterized by the necessity for having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the alkali metals in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. Likewise alkali metal dispersions on sand or on other low surface area silica are not satisfactory catalysts in this process. In addition, aluminas which contain combined water but which have relatively high surface areas are also not satisfactory supports. Such aluminas include dried alumina monohydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in this process of this invention include high surface area crystalline alumina modifications such as gamma-, eta- and theta-alumina, although these are not necessarily of equivalent suitability. However, as is obvious from the above discussion the limitation on the use of any particular support is one of freedom from combined or adsorbed water in combination with the surface area of the support selected. In addition to the aforementioned types of support another type is that which is prepared from an alkali aluminate such as sodium aluminate, potassium aluminate, etc., from which a substantial majority of the alkali metal has been removed leaving only the aluminate with a relatively minor amount of the alkali metal present.

The desired support, preferably, although not necessarily, gamma-, eta- or theta-alumina may be pretreated with a promoter in any manner. The preferred method for promoting the support is to contact or impregnate the support with the salt or hydroxide of an alkali metal or alkaline earth metal. A particularly effective salt which may be utilized comprises the nitrates of the alkali metal such as sodium nitrate, potassium nitrate, lithium nitrate, cesium nitrate, barium nitrate, calcium nitrate, magnesium nitrate, strontium nitrate, etc. Other salts of alkali or alkaline earth metals which will decompose at temperatures below about 750° C. may also be utilized, although not necessarily with equivalent results. If this method of impregnating the solid support is utilized the the promoted support is then calcined at a temperature in the range of from about 500° to about 750° C. whereby the salt of the alkali or alkaline earth metal is probably decomposed to the oxide.

The promoted metal oxide support is then further treated with an alkali metal to prepare the desired catalyst of the present invention. It has now been discovered that merely impregnating the solid support with the alkali metal, even with vigorous stirring of the support and the metal, results in a relatively poor distribution of the alkali metal on the metal oxide support. This will result in a catalyst which possesess a low activity as concerns the ability to convert the hydrocarbons to the desired product. The catalytic activity of the catalyst depends not only upon the percentage of alkali metal distributed on the surface of the metal oxide support but also on the uniformity of distribution of said metal, and it has been established that once the alkali metal has been distributed on the support, it cannot be redistributed by heating the support and metal above the melting point and subjecting the catalyst to further stirring.

It has now been discovered that catalysts which possess a relatively high hydrocarbon conversion activity and especially the ability to polymerize unsaturated organic compounds such as olefins and diolefins, and also to promote the isomerization of olefinic hydrocarbons, may be prepared by depositing or impregnating the metal on the promoted metal oxide support from a liquid ammonia solution. When the metal is deposited on the metal oxide support which is immersed in a liquid ammonia solution at a temperature approximately that of the reflux temperature of ammonia, —33° C., accompanied with vigorous stirring or rotation, the solution is in effect a molecular dispersion and the metal which is deposited on the promoted metal oxide support is in an extremely uniform and finely divided state, thereby yielding catalysts which possess a relatively high activity and corresponding ability to convert hydrocarbons subjected to treatment in the presence of such a catalyst to the desired conversion products, one example of this being the dimerization of propylene to form 2-methyl-2-pentene. It is also contemplated within the scope of this invention that a catalyst may be prepared by forming a promoted metal oxide support in the usual manner hereinbefore set forth and impregnating said support with an alkali metal or alkali metal amide. The thus formed catalyst may then be immersed in liquid ammonia whereby a more uniform distribution of the alkali metal over the surface of the promoted metal oxide support is achieved, thereby forming a catalyst which possesses a higher degree of hydrocarbon conversion activity. As hereinbefore set forth, the promoted metal oxide support may be treated with an alkali metal such as potassium, sodium, lithium, cesium or rubidium or the alkali metal amide such as potassium amide, sodium amide, lithium amide, cesium amide and rubidium amide. While the above discussions of the impregnation of the promoted metal oxide support has been concerned with an alkali metal it is also contemplated within the scope of this invention that said promoted metal oxide support may also be impregnated with an alkali metal amide. In the event that an amide is used the treatment is substantially identical, that is, the promoted metal oxide support prepared in the manner hereinabove set forth is immersed in a liquid ammonia solution of the amide accompanied by vigorous stirring or rotation. The liquid ammonia is allowed to evaporate leaving the desired aminated alkali metal impregnated on the promoted metal oxide support.

The hydrocarbon conversion processes utilizing the catalyst compositions of the present invention may be effected in any suitable manner and may comprise either a batch or a continuous type operation. One example of a batch type operation which may be used is the conversion of an olefinic hydrocarbon to a polymer thereof. A quantity of the unsaturated organic compound such as an olefinic hydrocarbon, a particular example of which is propylene, is placed in an appropriate apparatus such as a condensation flask or, if higher temperatures and pressures are to be used, in a rotating autoclave. The particular apparatus which has been selected will contain the conversion catalyst of the type hereinbefore set forth comprising an aminated alkali metal disposed on a promoted metal oxide support. If so desired a substantially inert organic diluent may also be used, said diluent including aromatic hydrocarbons having no alkyl substituents which possess an $\alpha$-hydrogen, examples of such hydrocarbons including benzene, naphthalene, pyrene, etc., or paraffinic hydrocarbons such as n-pentane, n-hexane, n-heptane, cyclopentane, cyclohexane, cycloheptane, etc. The apparatus and contents thereof are then heated to the desired reaction temperature and maintained thereat for a predetermined period of time. If higher than self-generated pressures are to be used an inert gas such as nitrogen may be pressed in until the desired pressure has been reached. At the end of this time the desired reaction product is separated from the catalyst and recovered by conventional means such as fractional distillation, crystallization, etc.

The process of this invention may also be effected in a continuous type operation, the catalyst comprising an aminated alkali metal disposed on a promoted metal oxide support being particularly suitable for use in a fixed bed type of operation. When this method is used the catalyst is disposed as a fixed bed in a reaction zone maintained at the proper operating conditions while the olefinic hydrocarbon and solvent, if one is desired, are continuously charged thereto through separate lines. The reaction zone may comprise an unpacked vessel or coil or may be lined with an adsorbent packing material such as dehydrated bauxite, alumina, fire brick or the like. Alternatively, the olefinic hydrocarbon and the organic solvent or diluent may be admixed prior to entry into said reactor and charged thereto in a single stream. In carrying out the process of this invention in a continuous manner, liquid hourly space velocities (the volume of liquid hydrocarbon charged to the reactor per volume of catalyst per hour) may be varied within a relatively wide range of from about 0.1 to about 20 or more, the preferred range being from about 0.1 to about 10. The desired reaction product is continuously withdrawn from the reaction zone, separated from the reactor effluent and purified by conventional means while said remaining effluent may be recharged at least in part to the reaction zone as a portion of the feed material.

Other continuous types of operations which may be used in this process include the compact moving bed type of operation in which the bed of catalysts and the reactants pass either concurrently or countercurrently to each other in the reaction zone, and the slurry type operation in which the catalyst is carried into the reaction zone as a slurry in one of the reactants.

The hydrocarbon conversion process of polymerization hereinbefore illustrated utilizing the catalysts of this invention is preferably effected at elevated temperatures and pressures, the temperature being in the range of from about 50° to about 300° C. or more. Generally speaking the pressure at which this process operates will be dependent upon the particular organic compound or compounds undergoing conversion and the particular catalyst which is used in the process, said pressure being sufficient to maintain a substantial portion of the hydrocarbons in the liquid phase, said pressure being in the range of from about 5 to about 250 atmospheres or more.

The following examples are given to illustrate the process of the present invention which, however, are not intended to limit the generally broad scope of the present invention in strict accordance therewith.

EXAMPLE I

A hydrocarbon conversion catalyst was prepared by treating fluoride-free gamma-alumina spheres that had been calcined for 4 hours at 550° C. prior to use. Following this the spheres were impregnated with lithium hydroxide solution equal to 0.5 weight percent of the alumina, the promoted alumina then being calcined again at 550° C. for an additional 2 hours. The promoted alumina was then impregnated with molten metallic potassium by rotating the potassium and the promoted alumina in a drum at a temperature of about 100° C. This catalyst was designated by the letter "A."

EXAMPLE II

In this example another catalyst was prepared in a manner similar to that set forth in Example I above, that is, a sample of fluoride-free gamma-alumina spheres that had been calcined for 4 hours at 550° C. prior to use was impregnated with a lithium hydroxide solution equal to 0.5 weight percent of the alumina and calcined for an additional 2 hours at 550° C. The promoted alumina spheres were then impregnated with metallic potassium in a manner similar to that set forth in Example I above. When the impregnation of the potassium on the alumina was completed the flask was cooled to room temperature. The entire catalyst was then immersed in liquid ammonia. Following this the mixture was evaporated with constant stirring during which time the potassium and potassium amide were distributed uniformly over the surface of the promoted alumina spheres. The product was then treated with an additional amount of gaseous ammonia, flushed with dried nitrogen and designated by the letter "B."

EXAMPLE III

The catalysts previously prepared were used to polymerize propylene. The reaction took place in a reactor which comprises a 48" long stainless steel tube of 1" inner diameter with an 18" spiral preheater. The tube contained a 5" catalyst bed which comprised approximately 50 cc. of catalyst. The tube was filled with catalyst under a nitrogen flow which had been dried by passage over a high surface sodium catalyst and sealed. Following this the tube was wrapped with heating tapes and insulated. The system was then pressured with nitrogen which had been dried by passage over high surface sodium following which the charge stock comprising a propylene-diluent mixture, said diluent containing from 5 to 10 mol percent hexenes, was pumped to the top of the reactor. The polymerization or dimerization of the propylene was effected at a temperature ranging from about 125° to about 155° C., a pressure of about 70 atmospheres and a liquid hourly space velocity of from 1 to 2. The discharge from the reactor was passed to a back pressure regulator which reduced the pressure to atmospheric pressure into a heated distilling flask. A cold finger stabilizer separated the liquid from the unreacted gases which were condensed into a series of two traps containing Dry Ice-acetone. Any uncondensed gases which resulted from the conversion were passed through a wet test meter.

The results of these tests are set forth in Table I below.

*Table I*

| Catalyst | A | B |
|---|---|---|
| LHSV | 1.3 | 2. |
| Inlet Temperature | 143 | 128. |
| Catalyst Temperature (Max.), ° C. | 150 | 156. |
| Feed | 22% Propylene, 78% Diluent. | 27% Propylene, 73% Diluent. |
| Propylene Conversion | 22% | 44%. |

EXAMPLE IV

In order to more clearly point out the invention of the present process in which a catalyst which has been subjected to treatment with liquid ammonia, by immersing the promoted metal support in liquid ammonia while impregnating said support with the alkali metal, a catalyst similar to that described in Example I was prepared. The catalyst was divided in half, following which one half was then treated with liquid ammonia followed by evaporation and treatment with gaseous ammonia. The first half of the catalyst which was not treated with liquid ammonia was designated as Catalyst "C," while the liquid ammonia treated catalyst was designated as "D." A propylene-n-pentane mixture in a mole ratio of 1:1 was subjected to polymerization in a manner similar to that set forth in Example III above. The results of these runs are set forth in Table II below.

*Table II*

| Catalyst | C | D |
|---|---|---|
| LHSV | 2 | 2 |
| Inlet Temperature, ° C. | 144–147 | 130 |
| Catalyst Temperature (Max.), ° C. | 152 | 151 |
| Propylene Conversions | 44% Maximum, dropped to 38%. | 48% |

It is noted from the above table that the catalyst which had been treated with liquid ammonia permitted a higher conversion of propylene at a lower inlet temperature. In addition an analysis of the desired product disclosed a slight difference in selectivity, the product resulting from the run using Catalyst C contained 90% dimer and 10% trimer while the run using Catalyst D resulted in a product distribution of 96% dimer and 4% trimer.

A visual examination of the catalyst prepared according to Example I disclosed evidence of a poor potassium distribution on the alumina, the pills being either dark or light in appearance, the dark pills upon analysis were found to contain 46.8% potassium, while the pills which were light in color showed only 1.1% potassium.

However, the promoted alumina spheres which were immersed in liquid ammonia during the impregnation of the potassium followed by treatment with gaseous ammonia were, upon visual examination found to be uniformly dark gray in color.

Therefore it is apparent from the results disclosed in Tables I and II above that catalysts prepared by the process of the present invention, that is, by immersing the promoted alumina in liquid ammonia while impregnating with the alkali metal or alkali metal amide followed by treatment in the case of the alkali metal with gaseous ammonia or by redistributing the alkali metal by immersion in liquid ammonia after said metal had been impregnated on the promoted metal oxide support provides a catalyst which is superior in conversion activity at lower reaction conditions than catalysts which were prepared by impregnating the promoted metal oxide support with an alkali metal or alkali metal amide in the absence of immersion in liquid ammonia.

We claim as our invention:

1. In the manufacture of catalysts wherein an anhydrous alumina support having a surface area of from about 25 to about 500 square meters per gram is impregnated with a catalytic agent selected from the group consisting of alkali metals and alkali metal amides, the improvement which comprises immersing said support in liquid ammonia during the impregnation thereof with said agent and thereafter evaporating the ammonia.

2. In the manufacture of catalysts wherein an anhydrous alumina support having a surface area of from about 25 to about 500 square meters per gram is impregnated with an alkali metal, the improvement which comprises immersing the alumina in liquid ammonia during the impregnation thereof with the alkali metal and thereafter evaporating the ammonia.

3. In the manufacture of catalysts wherein an anhydrous alumina support having a surface area of from about 25 to about 500 square meters per gram is impregnated with an alkali metal amide, the improvement which comprises immersing the alumina in liquid ammonia during the impregnation thereof with the alkali metal amide and thereafter evaporating the ammonia.

References Cited in the file of this patent

UNITED STATES PATENTS

| | | |
|---|---|---|
| 1,159,364 | De Jahn | Nov. 9, 1915 |
| 2,398,810 | Soday | Apr. 23, 1946 |
| 2,413,256 | Soday | Dec. 24, 1946 |
| 2,881,234 | Esmay et al. | Apr. 7, 1959 |

FOREIGN PATENTS

| | | |
|---|---|---|
| 218,992 | Great Britain | June 21, 1924 |